(12) United States Patent
Lim

(10) Patent No.: US 9,221,444 B2
(45) Date of Patent: Dec. 29, 2015

(54) BRAKE SYSTEM HAVING DRAG REDUCTION FUNCTION AND METHOD OF CONTROLLING THE SAME

(71) Applicant: MANDO CORPORATION, Pyeongtaek-si (KR)

(72) Inventor: Jeong-Min Lim, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/308,505

(22) Filed: Jun. 18, 2014

(65) Prior Publication Data

US 2015/0183412 A1 Jul. 2, 2015

(30) Foreign Application Priority Data

Dec. 27, 2013 (KR) .................. 10-2013-0165845

(51) Int. Cl.
*B60T 8/60* (2006.01)
*B60T 8/40* (2006.01)
*B60T 8/58* (2006.01)

(52) U.S. Cl.
CPC ........ *B60T 8/4081* (2013.01); *B60T 8/58* (2013.01)

(58) Field of Classification Search
CPC ... B60T 13/686; B60T 13/745; B60T 17/221; B60T 8/4275; B60T 8/4872; B60T 8/3275; B60T 8/4081; B60T 8/58

USPC ........... 303/155, 10, 11, 15, 71, 84.1, 64, 65, 303/157

See application file for complete search history.

(56) References Cited

U.S. PATENT DOCUMENTS

| | | | | | |
|---|---|---|---|---|---|
| 4,416,347 | A | * | 11/1983 | Bertling et al. | ............. 180/197 |
| 4,509,802 | A | * | 4/1985 | Solleder et al. | ............. 303/139 |
| 4,783,125 | A | * | 11/1988 | Belart et al. | ........... 303/122.11 |
| 2010/0253136 | A1 | * | 10/2010 | Greer | .......................... 303/84.2 |
| 2011/0215638 | A1 | * | 9/2011 | Sakuma | ........................ 303/11 |
| 2013/0332041 | A1 | * | 12/2013 | Kim et al. | ....................... 701/70 |

FOREIGN PATENT DOCUMENTS

KR 10-2011-0125286 11/2011

* cited by examiner

*Primary Examiner* — Pamela Rodriguez
(74) *Attorney, Agent, or Firm* — Ladas & Parry, LLP

(57) ABSTRACT

A brake system may have a drag reduction function of effectively attenuating drag by controlling the position of a pressurizing piston in a pressurizing cylinder through a motor to supply a fluid in a hydraulic line to the reserve tank such that negative pressure is created to forcibly withdraw the piston in a caliper, and a method of controlling the same. The brake system may include a pressurizing cylinder connected to a reserve tank to store a fluid, a motor to move a pressurizing piston forward, and a braking control unit to receive state information about the vehicle to determine whether the vehicle is braking or traveling, execute, when the vehicle is traveling, a negative pressure creation mode of driving the motor to move the pressurizing piston forward to create a negative pressure, and execute, when creation of the negative pressure is completed, a negative pressure maintaining mode.

11 Claims, 5 Drawing Sheets

BRAKE SYSTEM HAVING DRAG REDUCTION FUNCTION AND METHOD OF CONTROLLING THE SAME

CROSS-REFERENCE TO RELATED APPLICATION(S)

This application claims the benefit of Korean Patent Application No. 10-2013-0165845, filed on Dec. 27, 2013 in the Korean Intellectual Property Office, the disclosure of which is incorporated in its entirety herein by reference.

BACKGROUND

1. Field

Embodiments of the present invention relate to a brake system having a drag reduction function and a method of controlling the same and, more particularly, to a brake system having a drag reduction function of effectively attenuating a drag phenomenon by controlling the position of a pressurizing piston in a pressurizing cylinder connected to a reserve tank through a motor to supply a fluid in a hydraulic line to the reserve tank such that negative pressure is created to force the piston in a caliper to be withdrawn, and a method of controlling the same.

2. Description of the Related Art

Generally, a vehicle is provided with a brake system to selectively decelerate or stop the vehicle when necessary during traveling. Such brake system usually performs the braking operation by converting the kinetic energy of the traveling vehicle into thermal energy using friction and dissipating the produced heat into the ambient air.

That is, such brake systems are generally classified into a drum brake system and a disc brake system. In the case of the disc brake system, braking force is obtained from frictional force generated when a caliper, which is driven by hydraulic pressure generated in a master cylinder according to manipulation of a brake pedal, applies pressure to brake pads on both sides of a brake disc.

The aforementioned brake systems prevent production of a lost travel section of a stroke by sensing that the driver presses the brake pedal and sending the pressure accumulated in an accumulator to wheel cylinders. With this method, however, if the hydraulic pressure by the driver's foot force becomes greater than the pressure accumulated in the accumulator, the accumulator may fail to send the accumulated pressure to the wheel, and rather the pressure produced by the driver's foot force may be accumulated, resulting in increase of the lost travel section of the stroke. If the pressure of the accumulator is significantly high, the pressure may be fully delivered when the driver depresses the brake pedal. This may significantly contribute to degradation of brake feel.

In addition, a conventional brake system as disclosed in Korean Patent Application Publication No. 2011-0125286 produces braking force through friction between the disc and the brake pads. This frictional force is produced by the brake pads pushed by the hydraulic pressure created through the driver's manipulation of the brake pedal. When braking is terminated, the frictional force is removed by separating the brake pads from the disc using the knock-back phenomenon occurring between the brake pads and resilience (roll-back phenomenon) of a piston seal of the disc caliper.

However, with this method, a drag phenomenon, which refers to incomplete separation of the brake pads from the disc, may frequently occur. In addition, service life of the brake pads may be reduced and output may be degraded due to unnecessary friction.

Accordingly, a brake system that is capable of completely separating the disc and the brake pads to reduce drag is needed.

CITED REFERENCE

Patent Document

Korean Patent Application Publication No. 2011-0125286 (Nov. 21, 2011), "Disc Brake".

SUMMARY

Therefore, it is an aspect of the present invention to provide a brake system having a drag reduction function of effectively attenuating drag by controlling the position of a pressurizing piston in a pressurizing cylinder connected to a reserve tank through a motor to supply a fluid in a hydraulic line to the reserve tank such that negative pressure is created to force the piston in a caliper to be withdrawn, and a method of controlling the same.

Additional aspects of the invention will be set forth in part in the description which follows and, in part, will be obvious from the description, or may be learned by practice of the invention.

In accordance with one aspect of the present invention, a brake system to perform braking to decelerate or stop a vehicle includes a pressurizing cylinder connected to a reserve tank adapted to store a fluid, a motor to move a pressurizing piston forward in the pressurizing cylinder, and a braking control unit to receive state information about the vehicle to determine whether the vehicle is braking or traveling, execute, when the vehicle is traveling, a negative pressure creation mode of driving the motor to move the pressurizing piston forward to create a negative pressure, and execute, when creation of the negative pressure is completed, a negative pressure maintaining mode of maintaining the negative pressure.

In the negative pressure creation mode, a Normally-Open valve of each wheel may be closed, and the motor may be driven to move the pressurizing piston forward such that a fluid in a hydraulic line is supplied to the reserve tank.

In the negative pressure maintaining mode, a Normally-Open valve of each wheel may be re-opened, a valve connecting the wheel to the pressurizing cylinder may be opened, a valve connecting the reserve tank to a wheel cylinder may be closed, a valve connecting the reserve tank to the pressurizing cylinder may be closed, and the pressurizing piston may be withdrawn in the pressurizing cylinder until the pressurizing piston reaches a flow passage connecting the reserve tank to the pressurizing cylinder, such that the negative pressure is maintained.

The state information about the vehicle may include information items measured respectively by a wheel speed sensor, a pressure sensor, an accelerator pedal position sensor and a brake pedal position sensor, wherein the braking control unit may determine whether the vehicle is braking based on brake pedal manipulation information and pedal pressure information of the state information about the vehicle, and determine whether the vehicle is traveling based on accelerator pedal information and wheel speed information of the state information about the vehicle.

The braking control unit may determine whether the creation of the negative pressure has been completed after executing the negative pressure creation mode, and perform, when the creation of the negative pressure has not been completed, or execution of the negative pressure maintaining mode is interrupted, offset calibration of calibrating a position of the pressurizing piston.

The braking control unit may perform, when the execution of the negative pressure creation mode is interrupted or the creation of the negative pressure has not been completed, offset calibration of setting the position of the pressurizing piston to an origin, and perform, when the execution of the negative pressure maintaining mode is interrupted, offset calibration of setting a last position of the pressurizing piston at an atmospheric pressure to an origin.

In accordance with another aspect of the present invention, a method of controlling a brake system including a pressurizing cylinder connected to a reserve tank adapted to store a fluid and a motor to move a pressurizing piston forward in the pressurizing cylinder includes receiving state information about a vehicle, determining whether the vehicle is braking or traveling based on the received state information, executing, when it is determined, in the determining, that the vehicle is traveling, a negative pressure creation mode of driving the motor to move the pressurizing piston forward to create a negative pressure, and executing, when creation of the negative pressure is completed, a negative pressure maintaining mode of maintaining the negative pressure.

The executing of the negative pressure creation mode may include closing a Normally-Open valve of each wheel, and driving the motor to move the pressurizing piston forward such that a fluid in a hydraulic line is supplied to the reserve tank.

The executing of the negative pressure maintaining mode may include re-opening a Normally-Open valve of each wheel, opening a valve connecting the wheel to the pressurizing cylinder, closing a valve connecting the reserve tank to a wheel cylinder, closing a valve connecting the reserve tank to the pressurizing cylinder, and withdrawing the pressurizing piston in the pressurizing cylinder until the pressurizing piston reaches a flow passage connecting the reserve tank to the pressurizing cylinder, such that the negative pressure is maintained.

The executing may include determining, after executing the negative pressure creation mode, whether the creation of the negative pressure has been completed, and performing, when it is determined in the determining that the creation of the negative pressure has not been completed, offset calibration of calibrating a position of the pressurizing piston.

The performing of the offset calibration may include performing, the execution of the negative pressure creation mode is interrupted, offset calibration of setting the position of the pressurizing piston to an origin, and performing, when the execution of the negative pressure maintaining mode is interrupted, offset calibration of setting a last position of the pressurizing piston at an atmospheric pressure to an origin.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
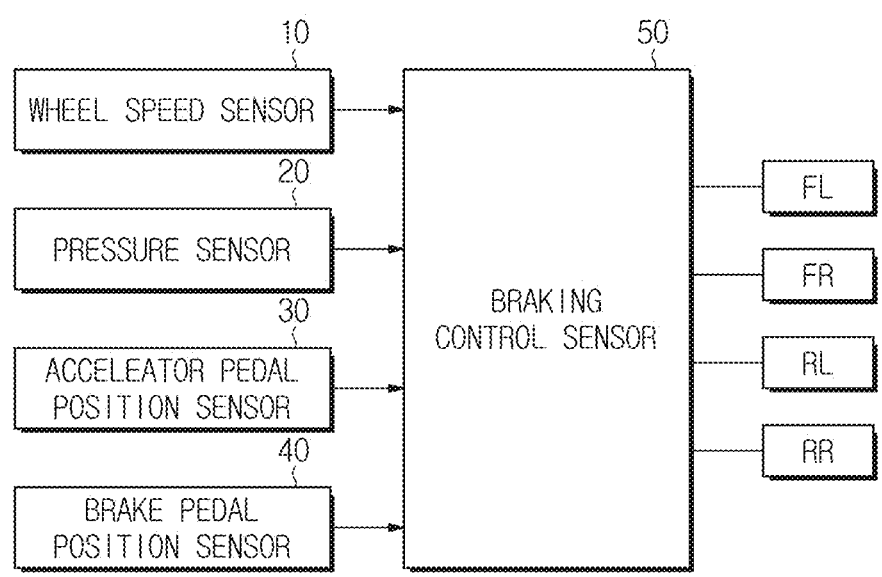
FIG. 1 is a block diagram illustrating a brake system having a drag reduction function according to an exemplary embodiment of the present invention.

Reference will now be made in detail to the embodiments of the present invention, examples of which are illustrated in the accompanying drawings, wherein like reference numerals refer to like elements throughout.

Figure 2:
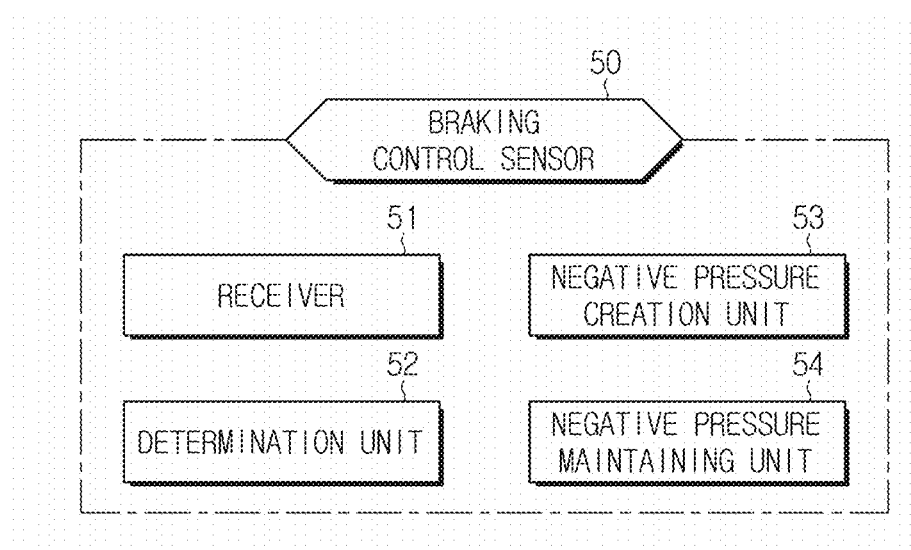
FIG. 2 is a block diagram illustrating a braking control unit shown in FIG. 1.

FIG. 1 is a block diagram illustrating a brake system having a drag reduction function according to an exemplary embodiment of the present invention, and FIG. 2 is a block diagram illustrating a braking control unit shown in FIG. 1.

Referring to FIG. 1, the brake system having a drag reduction function according to this embodiment includes a braking control unit 50. The braking control unit 50 receives state information about a vehicle and uses the received state information to perform, when the vehicle is traveling, a negative pressure creation mode of driving a motor to move a pressurizing piston in a pressurizing cylinder to supply a fluid in a hydraulic line to a reserve tank such that negative pressure is created, and performs a negative pressure maintaining mode of maintaining the created negative pressure when creation of the negative pressure is completed. As the negative pressure creation mode and the negative pressure maintaining mode are executed, the piston in a caliper installed at each wheel may be withdrawn, and thus a drag phenomenon, which refers to incomplete separation between the brake and the disc, may be suppressed.

The braking control unit 50 is electrically connected to a wheel speed sensor 10, a pressure sensor 20, an accelerator pedal position sensor 30 and a brake pedal position sensor 40. Thereby, the braking control unit 50 may receive information about the vehicle including the wheel speed, pressure, accelerator pedal position, and brake pedal position measured by the wheel speed sensor 10, the pressure sensor 20, the accelerator pedal position sensor 30 and the brake pedal position sensor 40. In addition, the braking control unit 50 may receive the state information about the vehicle over a controller area network (CAN). Herein, the pressure sensor 20 is a sensor to measure the pressure of the fluid coming out of the pressurizing cylinder.

Based on the state information about the vehicle received through the aforementioned various sensors, the braking control unit 50 determines whether the vehicle is braking or traveling and performs a normal braking mode upon determining that the vehicle is braking. In the normal braking mode, the piston in the caliper is moved forward by the hydraulic pressure supplied from the master cylinder to cause the disc and the brake pad to contact each other to produce friction, implementing the braking operation.

In the traveling situation, the braking control unit 50 executes a negative pressure creation mode to completely separate the disc from the brake pads, and executes a negative pressure maintaining mode when creation of the negative pressure is completed. When creation of the negative pressure is completed, the braking control unit 50 performs the negative pressure maintaining mode. However, when creation of the negative pressure is not completed, the braking control unit 50 performs the offset calibration of setting the position of the pressurizing piston to the origin.

In addition, when operation in the normal mode is requested during operation in the negative pressure maintaining mode, the braking control unit 50 stops the operation in the negative pressure maintaining mode, and performs the offset calibration of setting the last position of the pressurizing piston at atmospheric pressure to the origin. Thereby, when operation in the normal mode is requested during operation in the negative pressure maintaining mode, the braking control unit 50 may start the normal mode operation at the set position of the origin, which is an atmospheric reference position.

In addition, when operation in the normal mode is requested during operation in the negative pressure creation mode, the braking control unit 50 performs offset calibration of setting the current position of the pressurizing piston to the origin. Thereby, when operation in the normal mode is requested during operation in the negative pressure creation mode, the braking control unit 50 may start the normal mode operation at the current set position of the pressurizing piston.

Whether or not creation of the negative pressure has been completed may be determined based on the position of the pressurizing piston. That is, the braking control unit 50 determines that creation of the negative pressure has been completed when the pressurizing piston returns to a position where it begins to perform an operation of securing space for creation of the negative pressure. The position of the pressurizing piston is calculated based on an angle of rotation measured by a Hall sensor in the motor connected to the pressurizing cylinder.

Referring to FIG. 2, the braking control unit 50 includes a receiver 51, a determination unit 52, a negative pressure creation unit 53, and a negative pressure maintaining unit 54.

The receiver 51 receives the state information about the vehicle including the brake pedal information, pedal pressure information, accelerator pedal information and wheel speed information which are measured by the sensors discussed above. In addition, the receiver 51 may also receive the state information about the vehicle through an interface (e.g., a CAN).

The determination unit 52 determines, based on the received state information about the vehicle, whether the vehicle is braking or traveling.

When the determination unit 52 determines that the vehicle is braking, the braking control unit 50 operates in the normal mode in which the piston in the caliper is moved forward by the hydraulic pressure supplied from the master cylinder to cause the disc and the brake pads to contact each other to implement braking.

When the determination unit 52 determines that the vehicle is traveling, the negative pressure creation unit 53 executes the negative pressure creation mode. That is, in the negative pressure creation mode, the Normally-Open valve of each wheel is closed and the motor is driven to move forward the pressurizing piston in the pressurizing cylinder connected to the reserve tank in which the fluid is stored. More specifically, in the negative pressure creation mode, the fluid in the hydraulic line may be supplied to the reserve tank by the forward movement of the pressurizing piston, securing space for creation of negative pressure in the hydraulic line.

Figure 4:
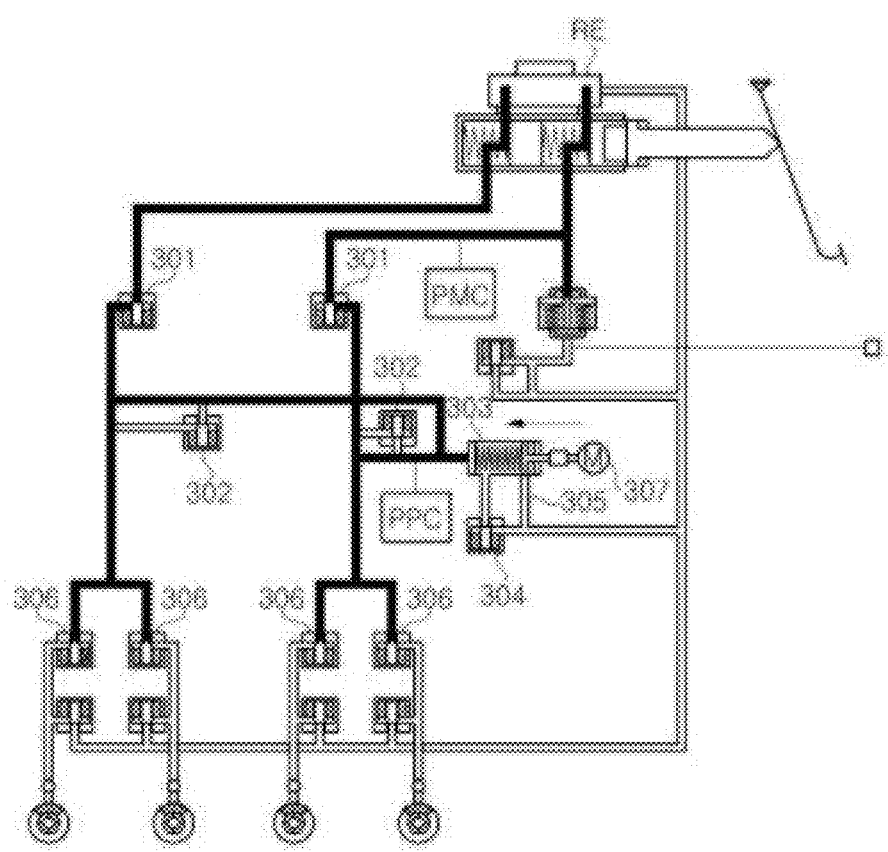
FIG. 4 is a diagram illustrating operation in a negative pressure creation mode.

Referring to FIG. 4, the negative pressure creation unit 53 closes the Normally-Open valve 306 of each wheel FL, RR, RL, FR, and drives the motor 307, thereby moving the pressurizing piston of the pressurizing cylinder 303 forward. As the pressurizing piston of the pressurizing cylinder 303 is moved forward by driving the motor 307, the fluid is supplied back to the reserve tank RE.

The negative pressure maintaining unit 54 determines whether creation of the negative pressure has been completed by the negative pressure creation unit 53. Upon determining that creation of the negative pressure has been completed, the negative pressure maintaining unit 54 executes the negative pressure maintaining mode in which the pressurizing piston of the pressurizing cylinder 303 is withdrawn to maintain the negative pressure.

When creation of the negative pressure by the negative pressure creation unit 53 is not completed, the negative pressure maintaining unit 54 performs the offset calibration of setting the position of the pressurizing piston in the pressurizing cylinder to the origin. In addition, when the negative pressure maintaining unit 54 receives a request for operation in the normal mode during execution of the negative pressure maintaining mode, it stops the operation in the negative pressure maintaining mode and performs the offset calibration of setting the last position of the pressurizing piston at atmospheric pressure to the origin. Thereafter, the operation in the normal mode may begin at an atmospheric pressure reference position, which is the set position of the origin.

Figure 5:
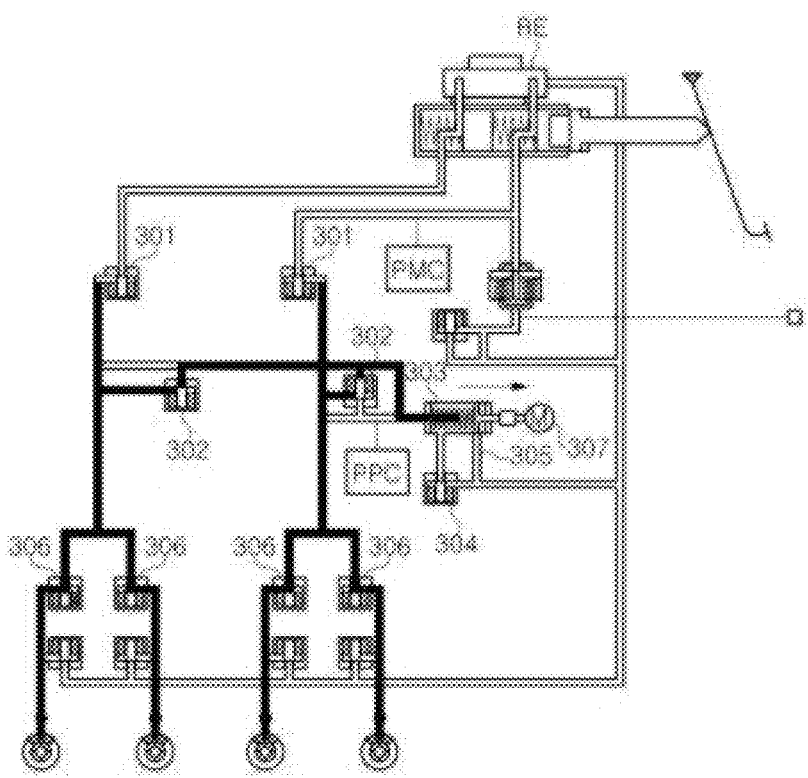
FIG. 5 is a diagram illustrating operation in a negative pressure maintaining mode.

Referring to FIG. 5, the negative pressure maintaining unit 54 re-opens the Normally-Open valve 306 of each wheel FL, RR, RL, FR, opens the valve 302 connecting the wheels FL, RR, RL and FR to the pressurizing cylinder 303, closes a valve 301 connecting the reserve tank RE to the wheel cylinders, closes a valve 304 connecting the reserve tank RE to the pressurizing cylinder 303, and drives the motor 307 to withdraw the pressurizing piston in the pressurizing cylinder 303 until the piston reaches a flow passage 305 connecting the reserve tank RE to the pressurizing cylinder 303. As the negative pressure in the hydraulic line is maintained in this way, the brake pads may be completely separated from the disc, and accordingly drag may be reduced.

Hereinafter, a method of controlling the brake system having a drag reduction function configured as above will be described with reference to FIG. 3.

Figure 3:
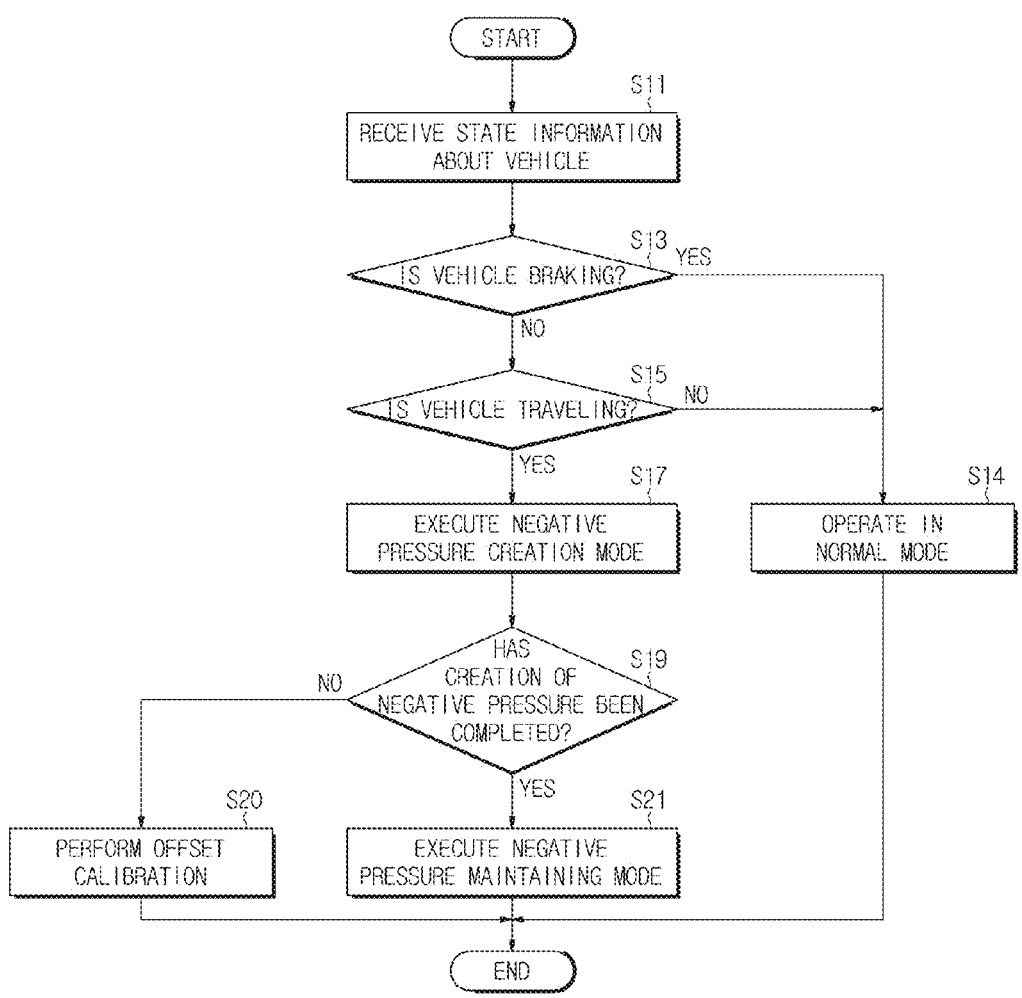
FIG. 3 is a flowchart illustrating a method of controlling a brake system having a drag reduction function according to one embodiment of the present invention.

FIG. 3 is a flowchart illustrating a method of controlling a brake system having a drag reduction function according to one embodiment of the present invention.

Referring to FIG. 3, the braking control unit 50 receives the state information of the vehicle (S11). That is, the braking control unit 50 receives the measured information from the wheel speed sensor 10, the pressure sensor 20, the accelerator pedal position sensor 30 and the brake pedal position sensor 40.

The braking control unit 50 determines whether the vehicle is braking or traveling, using the received state information about the vehicle (S13).

Upon determining in operation S13 that the vehicle is braking, namely, that a brake pedal manipulation signal or pedal pressure information, or both are received, the braking control unit 50 executes the normal mode (S14). In the normal mode, hydraulic pressure is supplied from the master cylinder, and thus the piston in the caliper moves forward, causing the brake pads and the disc to contact each other to perform braking.

Upon determining in operation S13 that the vehicle is not braking, the braking control unit 50 determines whether the vehicle is traveling (S15).

Upon determining in operation S15 that the vehicle is not traveling, the braking control unit 50 moves to operation S14 in the process, and executes the normal mode.

Upon determining in operation S15 that the vehicle is traveling, the braking control unit 50 executes the negative pressure creation mode (S17). As described above, in the negative pressure creation mode, the Normally-Open valve 306 of each wheel is closed, and the motor 307 is driven to move the pressurizing piston in the pressurizing cylinder 303 such that the fluid in the hydraulic line is supplied to the reserve tank RE. Thereby, negative pressure is created.

Thereafter, the braking control unit 50 determines whether creation of the negative pressure has been completed. (S19). At this time, the braking control unit 50 may determine, based on the position of the pressurizing piston in the pressurizing cylinder 303, whether creation of the negative pressure has been completed. The position of the pressurizing piston is calculated based on an angle of rotation measured by a Hall sensor in the motor 307. That is, the braking control unit 50 determines that creation of the negative pressure has been completed when the pressurizing piston returns to a position where it begins to perform an operation of securing space for creation of the negative pressure.

Upon determining in operation S19 that creation of the negative pressure is not completed, the braking control unit 50 performs offset calibration of forcing the pressurizing piston in the pressurizing cylinder 303 to return to the origin (S20).

Upon determining in operation S19 that creation of negative pressure has been completed, the braking control unit 50 executes the negative pressure maintaining mode (S21). As described above, in the negative pressure maintaining mode, the Normally-Open valve 306 of each wheel FL, RR, RL, FR is re-opened, the valve 302 connecting the wheels FL, RR, RL and FR to the pressurizing cylinder 303 is opened, a valve 301 connecting the reserve tank RE to the wheel cylinders is closed, a valve 304 connecting the reserve tank RE to the pressurizing cylinder 303 is closed, and the motor 307 is driven to withdraw the pressurizing piston in the pressurizing cylinder 303 until the piston reaches a flow passage 305 connecting the reserve tank RE to the pressurizing cylinder 303. Thereby, the negative pressure is maintained in the section from the valve 301, which connects the reserve tank RE to the wheel cylinders, to the wheel cylinders, and accordingly the piston in the caliper is withdrawn. Thereby, the brake pads and the disc are kept spaced apart from each other, and therefore drag between the brake pads and the disc may be reduced.

As is apparent from the above description, according to one embodiment of the present invention, negative pressure is created by controlling the position of a pressurizing piston in a pressurizing cylinder connected to a reserve tank through a motor such that a fluid in a hydraulic line is supplied to the reserve tank. Accordingly, the piston in a caliper may be forcibly withdrawn, more effectively reducing drag.

In addition, according to one embodiment, when operation in a normal mode is requested during execution of a negative pressure creation mode, the negative pressure creation mode is interrupted, and an offset calibration of setting the position of the pressurizing piston to the origin is performed. When operation in a normal mode is requested during execution of a negative pressure maintaining mode, offset calibration of setting the last position of the pressurizing piston at atmospheric pressure to the origin is performed. Thereby, loss of brake responsiveness and brake feel may be minimized.

Although a few embodiments of the present invention have been shown and described, it would be appreciated by those skilled in the art that changes may be made to the embodiments without departing from the principles and spirit of the invention, the scope of which is defined in the claims and their equivalents.

What is claimed is:

1. A brake system to perform braking to decelerate or stop a vehicle, the brake system comprising:
a pressurizing cylinder connected to a reserve tank adapted to store a fluid;
a motor to move a pressurizing piston forward in the pressurizing cylinder; and
a braking control unit to receive state information about the vehicle to determine whether the vehicle is braking or traveling, execute, when the vehicle is traveling, a negative pressure creation mode of driving the motor to move the pressurizing piston forward to create a negative pressure, and execute, when creation of the negative pressure is completed, a negative pressure maintaining mode of maintaining the negative pressure.

2. The brake system according to claim 1, wherein, in the negative pressure creation mode, a Normally-Open valve of each wheel is closed, and the motor is driven to move the pressurizing piston forward such that a fluid in a hydraulic line is supplied to the reserve tank.

3. The brake system according to claim 1, wherein, in the negative pressure maintaining mode, a Normally-Open valve of each wheel is re-opened, a valve connecting the wheel to the pressurizing cylinder is opened, a valve connecting the reserve tank to a wheel cylinder is closed, a valve connecting the reserve tank to the pressurizing cylinder is closed, and the pressurizing piston is withdrawn in the pressurizing cylinder until the pressurizing piston reaches a flow passage connecting the reserve tank to the pressurizing cylinder, such that the negative pressure is maintained.

4. The brake system according to claim 1, wherein the state information about the vehicle comprises information items measured respectively by a wheel speed sensor, a pressure sensor, an accelerator pedal position sensor and a brake pedal position sensor,
wherein the braking control unit determines whether the vehicle is braking based on brake pedal manipulation information and pedal pressure information of the state information about the vehicle, and determines whether the vehicle is traveling based on accelerator pedal information and wheel speed information of the state information about the vehicle.

5. The brake system according to claim 1, wherein the braking control unit determines whether the creation of the negative pressure has been completed after executing the negative pressure creation mode, and performs, when the creation of the negative pressure has not been completed, or execution of the negative pressure maintaining mode is interrupted, offset calibration of calibrating a position of the pressurizing piston.

6. The brake system according to claim 5, wherein the braking control unit performs, when the execution of the negative pressure creation mode is interrupted or the creation of the negative pressure has not been completed, offset calibration of setting the position of the pressurizing piston to an origin, and performs, when the execution of the negative pressure maintaining mode is interrupted, offset calibration of setting a last position of the pressurizing piston at an atmospheric pressure to an origin.

7. A method of controlling a brake system including a pressurizing cylinder connected to a reserve tank adapted to store a fluid and a motor to move a pressurizing piston forward in the pressurizing cylinder, the method comprising:
receiving state information about a vehicle;
determining whether the vehicle is braking or traveling based on the received state information;
executing, when it is determined, in the determining, that the vehicle is traveling, a negative pressure creation mode of driving the motor to move the pressurizing piston forward to create a negative pressure, and executing, when creation of the negative pressure is completed, a negative pressure maintaining mode of maintaining the negative pressure.

8. The method according to claim 7, wherein the executing of the negative pressure creation mode comprises closing a Normally-Open valve of each wheel, and driving the motor to move the pressurizing piston forward such that a fluid in a hydraulic line is supplied to the reserve tank.

9. The method according to claim 7, wherein the executing of the negative pressure maintaining mode comprises re-opening a Normally-Open valve of each wheel, opening a valve connecting the wheel to the pressurizing cylinder, closing a valve connecting the reserve tank to a wheel cylinder, closing a valve connecting the reserve tank to the pressurizing cylinder, and withdrawing the pressurizing piston in the pressurizing cylinder until the pressurizing piston reaches a flow passage connecting the reserve tank to the pressurizing cylinder, such that the negative pressure is maintained.

10. The method according to claim 7, wherein the executing comprises:
- determining, after executing the negative pressure creation mode, whether the creation of the negative pressure has been completed; and
- performing, when it is determined in the determining that the creation of the negative pressure has not been completed, offset calibration of calibrating a position of the pressurizing piston.

11. The method according to claim 10, wherein the performing of the offset calibration comprises: performing, when the execution of the negative pressure creation mode is interrupted, offset calibration of setting the position of the pressurizing piston to an origin, and performing, when the execution of the negative pressure maintaining mode is interrupted, offset calibration of setting a last position of the pressurizing piston at an atmospheric pressure to an origin.

* * * * *